(12) United States Patent
Ogawa

(10) Patent No.: US 7,081,967 B2
(45) Date of Patent: *Jul. 25, 2006

(54) IMAGE DATA COMMUNICATIONS DEVICE AND METHOD

(75) Inventor: Hidehiko Ogawa, Kanagawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 243 days.

This patent is subject to a terminal disclaimer.

(21) Appl. No.: 10/767,621

(22) Filed: Jan. 30, 2004

(65) Prior Publication Data

US 2004/0184084 A1    Sep. 23, 2004

Related U.S. Application Data

(63) Continuation of application No. 09/461,402, filed on Dec. 15, 1999, now Pat. No. 6,710,894.

(30) Foreign Application Priority Data

Mar. 4, 1999    (JP) ................................. 11-056493

(51) Int. Cl.
*H04N 1/00* (2006.01)

(52) U.S. Cl. ..................... 358/1.15; 358/402; 358/440; 379/100.08

(58) Field of Classification Search ............... 358/1.15, 358/402, 440; 379/100.01, 100.08, 100.13, 379/100.17
See application file for complete search history.

(56) References Cited

U.S. PATENT DOCUMENTS

| 5,508,819 | A |   | 4/1996  | Yanagisawa et al. |
|-----------|---|---|---------|-------------------|
| 5,675,507 | A |   | 10/1997 | Bobo, II          |
| 5,742,769 | A | * | 4/1998  | Lee et al. .................... 709/206 |
| 5,798,845 | A | * | 8/1998  | Baek et al. ................. 358/434 |
| 5,862,202 | A |   | 1/1999  | Bashda            |
| 5,878,230 | A | * | 3/1999  | Weber et al. ................ 709/238 |

(Continued)

FOREIGN PATENT DOCUMENTS

EP    0801492    10/1997

(Continued)

OTHER PUBLICATIONS

RFC821 "Simple Mail Transfer Protocol" by Jonathan B. Postel, published on Aug. 1994.

*Primary Examiner*—Thomas D. Lee
(74) *Attorney, Agent, or Firm*—Greenblum & Bernstein, P.L.C.

(57) ABSTRACT

An image data communication apparatus is connected to an image data source and to a network, and transmits image data attached to an e-mail to a receiving apparatus via the LAN. The e-mail including a mail from command and a mail message. The image data communication apparatus comprises a memory which stores a default mail address and a panel section which inputs a mail address of a user to the image data communication apparatus. The image data communication apparatus comprises a controller which sets the default mail address into the mail from command of the e-mail to which the image data is attached when the mail address of the user is not input by the panel section, and sets the mail address of the user input by the panel section into the mail from command of the e-mail to which the image data is attached when the mail address of the user is input by the panel section. Thus, when an error occurs, a mail error message is returned to the mail address of the user.

33 Claims, 12 Drawing Sheets

U.S. PATENT DOCUMENTS

| | | | |
|---|---|---|---|
| 5,881,233 A | 3/1999 | Toyoda et al. | |
| 6,208,426 B1 | 3/2001 | Saito et al. | |
| 6,493,107 B1 | 12/2002 | Toyoda et al. | |
| 6,710,894 B1 * | 3/2004 | Ogawa | 358/1.15 |
| 6,885,470 B1 | 4/2005 | Toyoda | |
| 2002/0059362 A1 * | 5/2002 | Maeda | 709/203 |

FOREIGN PATENT DOCUMENTS

| | | |
|---|---|---|
| EP | 0812100 | 12/1997 |
| EP | 0881916 | 1/1998 |
| EP | 0845894 | 6/1998 |
| EP | 0881816 | 12/1998 |
| GB | 2293901 | 10/1996 |
| JP | 07-104955 | 7/1995 |
| JP | 08-087342 | 4/1996 |
| JP | 08-242326 | 9/1996 |
| JP | 10-341306 | 1/1998 |
| JP | 10-107944 | 4/1998 |
| JP | 10-191010 | 7/1998 |
| JP | 10-307769 | 11/1998 |
| JP | 10-28217 | 12/1998 |
| JP | 10-327288 | 12/1998 |

* cited by examiner

FIG. 2A

Transmitter Information Default

| Machine's Name | Mail Address |
|---|---|
| Internet FAX | fax@aaa.bbb.jp |

FIG. 2B

Transmitter's Identification Table

| Transmitter's Name | Mail Address |
|---|---|
| suzuki | usr1@abc. defg. jp |
| yamada | usr2@abc. defg. jp |
| MGCS | *not set* |
| *not set* | usr4@abc. defg. jp |
|  |  |

FIG. 5A    Mail From Command
                MAIL<SP>FROM:<reverse-path>

Mail Message
               Mime-Version: 1. 0
               X-Mailer: Internet FAX, MGCS
               From:"comment"<Mail address>
               Subject: * * * *
               To:aaa@bbb. ccc. ddd Fig. 5B    Change Transmitter's Name of Mail Message
           into "suzuki"
               Mail From Command
                   MAIL FROM:<fax@aaa. bbb. jp>

Mail Message
                   Mime-Version: 1. 0
                   X-Mailer: Internet FAX, MGCS
                   From:"suzuki", fax@aaa. bbb. jp>
                   Subject: * * * *
                   To:aaa@bbb. ccc. ddd FIG. 5C    Change Transmitter's Name and Mail Address
           of Mail Message into "suzuki"
               Mail From Command
                   MAIL FROM:<fax@aaa. bbb. jp>

Mail Message
                   Mime-Version: 1. 0
                   X-Mailer: Internet FAX, MGCS
                   From:"suzuki"<usr1@abc. defg. jp>
                   Subject: * * * *
                   To:aaa@bbb. ccc. ddd

FIG. 5D

Change Transmitter's Name, Mail Address and
Mail From Command into "suzuki"
    Mail From Command
        Mail FROM:<usr1@abc. defg. jp>

Mail Message
        Mime−Version:1. 0
        X−Mailer:Internet FAX, MGCS
        From:"suzuki"<usr1@abc. defg. jp>
        Subject: * * * *
        To:aaa@bbb. ccc. ddd

FIG. 5E

Change Transmitter's Name, Mail Address and
Mail From Command into "MGCS"
    Mail From Command
        MAIL FROM:<fax@aaa. bbb. jp>

Mail Message
        Mime−Version:1. 0
        X−Mailer:Internet FAX, MGCS
        From:"MGCS"<fax@aaa. bbb. jp>
        Subject: * * * *
        To:aaa@bbb. ccc. ddd

FIG. 5F

Change Transmitter's Name, Mail Address and
Mail From Command into "usr4@abc. defg. jp"
    Mail From Command
        MAIL FROM:<usr4@abc. defg. jp>

Mail Message
        Mime−Version:1. 0
        X−Mailer:Internet FAX, MGCS
        From:<usr4@abc. defg. jp>
        Subject: * * * *
        To:aaa@bbb. ccc. ddd

FIG. 9A

Transmitter's ID Table

| I P Address | I·P MASK |
|---|---|
| 001.001.001.001 | 255.255.255.128 |
| 001.001.002.123 | |
| 001.002.003.111 | |
| | |

FIG. 9B

Host Name Table

| Host Name |
|---|
| pc1.abc.defg.jp |
| pc2.abc.defg.jp |
| aaa.bbb.jp |
| |

FIG. 10

REGISTRATION AND CONFIRMATION OF TRANSMITTER INFORMATION

PASSWORD [_____] —f1

REGISTRATION  ○—f2  Registration of Data

READ OUT  ○—f3  Display Registerd Data

| f4 Transmitter's Name | Mail Address f5 | Error Mail |
|---|---|---|
| 01 [_____] | [_____] | ○ —f6 |
| 02 [_____] | [_____] | ○ |
| 03 [_____] | [_____] | ○ |
| 04 [_____] | [_____] | ○ |
| 05 [_____] | [_____] | ○ |
| 06 [_____] | [_____] | ○ |
| 07 [_____] | [_____] | ○ |
| 08 [_____] | [_____] | ○ |
| 09 [_____] | [_____] | ○ |
| 10 [_____] | [_____] | ○ | f7— [ SEND ]    [ ERASE ] —f8

FIG. 11

```
R: 220 BBN-UNIX. ARPA Simple Mail Transfer Service Ready
S: HELO USC-ISIF. ARPA
R: 250 BBN-UNIX. APPA S: MAIL FROM:<Smith@USC-ISIF. ARPA>
R: 250 OK S: RCPT TO:<Jones@BBN-UNIX. ARPA>
R: 250 OK S: RCPT TO:<Green@BBN-UNIX. ARPA>
R: 550 No Such user here S: RCPT TO:<Brown@BBN-UNIX. ARPA>
R: 250 OK S: DATA
R: 354 Start mail input;end with <CRLF>. <CRLF>
S: Blah blah blah...
R: ...etc. etc. etc.
S:
R: 250 OK S: QUIT
R: 221 BBN-UNIX. ARPA Service closing transmission channel
```

FIG. 12A    Verify IP Address without MASK
           from 001.001.002.123    Coincident        Receive
           from 001.001.002.124    Not Coincident    Reject FIG. 12B    Verify IP Address with MASK
           from 001.001.001.103    Coincident        Receive
           from 001.001.001.201    Not Coincident    Reject FIG. 12C    Verify Host Name
           from pc1.abc.defg.jp    Coincident        Receive
           from pc3.abc.defg.jp    Not Coincident    Reject FIG. 12D    Verify Host Name
           from ws1.aaa.bbb.jp     Coincident        Receive
           from ws2.aab.bbb.jp     Not Coincident    Reject

IMAGE DATA COMMUNICATIONS DEVICE AND METHOD

CROSS-REFERENCE TO RELATED APPLICATION

The present application is a continuation of U.S. application Ser. No. 09/461,402 filed on Dec. 15, 1999 now U.S. Pat. No. 6,710,894. The present invention relates to the subject matter disclosed in Japanese Patent Application No. 11-056493, filed on Mar. 4, 1999, the disclosures of both of which are expressly incorporated herein by reference in their entirety.

BACKGROUND OF THE INVENTION

1. Field of the Invention

The present invention relates to an image data communication apparatus such as a network facsimile apparatus, and a method of communicating the image data.

2. Background Information

When a user sends data through a facsimile machine, the data generally contains a transmitter's identification. The transmitter's identification is usually registered at the facsimile machine, and is overwritten on image data or printed on the upper end of the image data received by a recipient. The transmitter's identification is generally input to the facsimile machine through its operation panel. Identification data created by a personal computer (PC) can be also sent into a facsimile machine via the PSTN (Public Switched Telephone Network). On the other hand, registration through E-mail (electronic mail) can be practiced in a network facsimile that communicates through a network such as the Internet.

As discussed above, using a regular facsimile machine, a recipient can identify who sent a message even it has no name in a "From:" line, because the transmitter's identification is overwritten on the message or printed on the upper end of the received paper. However, in the case of the network facsimile, a message does not always arrive at a facsimile machine, but it may arrive at a terminal of a PC or a workstation, which is capable of receiving E-mail. In such a case, the terminal confirms the arrival of data with E-mail browsing software, and because the message is sent as a file attached to the E-mail, a recipient cannot identify who sent the message until the recipient reads the attached file. When the recipient answers the message through a reply function of the browsing software, the answer is always sent back to the facsimile machine that has sent the message. Therefore, if an intended person does not watch the machine for the arrival of an answer, or another person is present at the machine, the answer is sometimes misplaced or delivered to a wrong address.

Further, a facsimile machine's operation panel does not easily register multi-digit data such as a mail address, and further, such registering is time consuming. On the other hand, registration through the PSTN requires a dedicated program at a PC side, and this method thus has not become popular. Registration through E-mail allows a simple input operation; however, a format readable by a facsimile machine must be employed. Thus, the operator must be furnished with some knowledge before registering a mail address.

SUMMARY OF THE INVENTION

Accordingly, it is an object of the present invention to provide a communications device and a method of communication, through which a recipient can identify a transmitter before opening a file attached to an E-mail when the recipient receives the E-mail with E-mail browsing software.

It is yet another object of the present invention to provide a communications device and a method of communication, through which a transmitter can send an answer to an intended person when the transmitter uses a reply function of the E-mail browsing software.

It is still another object of the present invention to provide a communications device and a method of communication, where a transmitter's identification can be registered with a simple operation without any special knowledge.

A communications device of the present invention comprises the following elements in order to achieve these objects: an image data creating section; an image data sending section for sending image data according to an E-mail message transfer protocol; and a register for registering a plurality of identifications of the transmitter. The device also includes an identification sending section for selecting one of the identifications and sending it through E-mail.

Using the communications device having the elements discussed above, when a transmitter sends image data by E-mail over the Internet, an operator (in most cases the transmitter is an operator) puts the identification in a "From:" line for each mail based on the transmitter's intention. A recipient then can identify the transmitter before opening a file attached to the image data. When the recipient answers the E-mail using a reply function of the E-mail browsing software, this communications device allows the answer data to reach an intended person.

According to another aspect of the present invention, the communications device does not output the registered data or HTML (Hyper Text Markup Language) document for data input when an unauthorized request is received. Such an HTTP (Hyper Text Transfer Protocol) request comes from a host or an address different from the registered hosts or IP (Internet Protocol) addresses. In response to the unauthorized request, the device is prevented from displaying the registered document or registration screen. Therefore, the communications device of the present invention allows an transmitter's identification to be registered or displayed only when a registered host or a registered IP address holder makes a request. The identifications are thus kept confidential and are not disclosed to non-registered hosts and IP addresses.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout the several views of the drawing, and wherein:

FIG. 2A shows a default transmitter's identification;

FIG. 2B shows a table of transmitter's identification in accordance with the exemplary embodiment of the present invention;

FIG. 5A shows a basic mail format, in accordance with the SMTP (Simple E-mail Transfer Protocol) standard used in the exemplary embodiment;

FIG. 5B shows a format where a transmitter's name is changed, in accordance with the SMTP standard used in the exemplary embodiment;

FIG. 5C shows a format where a transmitter's name and E-mail address are changed, in accordance with the SMTP standard used in the exemplary embodiment;

FIG. 5D shows a format where the transmitter's name, E-mail address, and mail From command are changed, in accordance with the SMTP standard used in the exemplary embodiment;

FIG. 5E shows a format where the transmitter's name, E-mail address, and mail From command are changed, in accordance with the SMTP standard used in the exemplary embodiment;

FIG. 5F shows a format where the transmitter's name, E-mail address, and mail From command are changed, in accordance with the SMTP standard used in the exemplary embodiment;

FIG. 9A shows an exemplary transmitter's ID table where identifications have been registered;

FIG. 9B shows an exemplary host name table where identifications have been registered;

FIG. 10 shows an HTML document where the transmitter's IDs are to be registered in accordance with the exemplary embodiment of the present invention;

FIG. 11 depicts an exemplary exchanging of information between servers on the Internet, in accordance with the exemplary embodiment of the present invention;

FIG. 12A shows a verification procedure of an IP address without a mask,

FIG. 12B shows a verification procedure of an IP address with a mask;

FIG. 12C shows a verification procedure of a host name; and

FIG. 12D show a verification procedures of a host name.

DETAILED DESCRIPTION OF THE EXEMPLARY EMBODIMENT

An exemplary embodiment of the present invention is described hereinafter with reference to the accompanying drawings.

Figure 1:
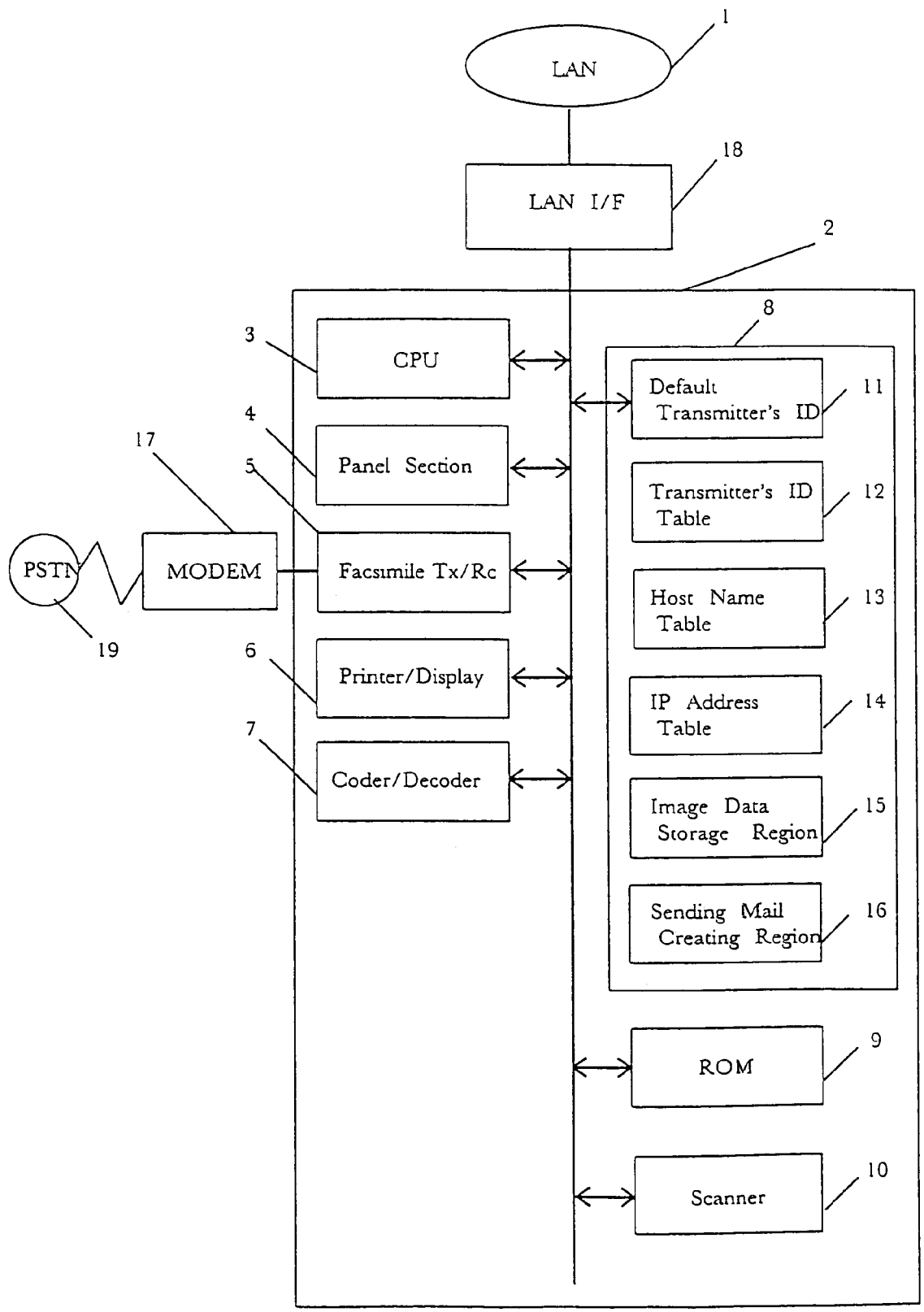
FIG. 1 is a block diagram illustrating a communications device in accordance with an exemplary embodiment of the present invention.

FIG. 1 is a block diagram illustrating a communications device in accordance with an exemplary embodiment of the present invention. LAN (local area network) line 1 is coupled to communications device 2 via LAN interface 18. Communications device 2 sends and receives image data via LAN line 1 or PSTN 19, and is provided with facsimile and E-mail sending/receiving functions. In FIG. 1, these functions are integrated and housed into a cabinet, which is called communications device 2. Alternatively, functions and sections can be housed into multiple boxes, which can be integrated into a system to function as communications device 2. For instance, a PC having a separate scanner and printer can be used as device 2.

As shown in FIG. 1, communications device 2 comprises the following elements:

(a) CPU (central processing unit) 3 for controlling the entire operation of device 2;

(b) panel section 4 for setting an operation and controlling the operation of device 2 through operation keys and buttons;

(c) fax (facsimile) communication section (tx/rc) 5 for sending/receiving data;

(d) recording section (printer/display) 6 for recording the received data on a sheet of paper or displaying the received data on a display device;

(e) scanner 10 for scanning image data to be sent as electrical signals;

(f) coding section (coder/decoder) 7 for coding or decoding image data;

(g) memory 8 for storing transmitters' identifications, image data to be sent, and sent mail data; and (h) ROM (read only memory) 9 for storing an operation program of device 2.

Coding section 7 encodes the image data scanned by scanner 10 into binary data, or decodes the binary data received through E-mail and converts it into facsimile format. In other words, coding section 7 has functions for converting image data into an E-mail format or facsimile format, converting each format into the other format, and compressing or de-compressing data when necessary.

Memory 8 comprises the following elements:

(g-1) default transmitter's identification 11;

(g-2) transmitter's ID table 12;

(g-3) host name table 13;

(g-4) IP address table 14;

(g-5) image data storage region 15; and (g-6) sending mail creating region 16.

The default transmitter's identification 11 stores the transmitter's name and his/her mail address of the communications device 2 in pairs, and sets transmitter's identifications. Transmitter's ID table 12 stores respective transmitter's identifications following the default transmitter's identification 11, thus table 12 is capable of storing multiple transmitter's identifications. Communications device 2 is usually used by multiple users, and when each user uses respective identifications proper to him/her, multiple transmitter's identifications are registered. If communications device 2 is exclusively used by one user, multiple transmitter's identifications need not to be registered; however, a transmitter's name and mail address are the minimum requirement for a transmitter's identification. In addition to these, a company name, telephone number, and fax number may be used depending on needs. Therefore, multiple pieces of information are registered at communications device 2 regardless of the number of users.

Names of CPUs linked to communications device 2 are registered at host name table 13 of device 2. In the same manner, IP addresses are registered at IP address table 14. Image data storage region 15 stores the image data scanned in with scanner 10. Sending mail creating region 16 converts the image data stored in storage region 15 into an E-mail format, thereby creating image data to be sent by E-mail. A given operation at panel section 4 allows CPU 3 to control this E-mail image data to send the image data to another communications device 2 via LAN line 1 and over the Internet. This procedure is detailed later. Modem 17 is connected to fax communication section 5, and sends/receives data via PSTN 19.

A basic operation of sending/receiving image data in this embodiment is described hereinafter. Sending/receiving image data through E-mail is now described.

First, set a message to be sent at scanner 10, then input a mail address of a recipient through operation panel 4. Second, push the start button on panel 4, then CPU 3 commences executing the program stored in ROM 9 so that scanner 10 reads the message. The image data input by scanner 10 is coded into binary data by coding section 7, and stored in image data storage region 15 in memory section 8. The stored image data is converted into an E-mail format by sending mail creating region 16. Through this conversion, the image data is converted into 7-bit text code in accordance with "MIME" (Multipurpose Internet Mail Extensions), which is well-known as an Internet E-mail standard. The image data converted into the E-mail format is sent via LAN line 1 as an E-mail according to the E-mail message transfer protocol.

At this time, when an operator does not specify a transmitter's identification, the transmitter's identification stored in the default transmitter's identification 11 is attached to this E-mail as a piece of E-mail information. If the operator operates panel section 4 and sets a transmitter's identification to be attached to this E-mail, or selects a specific identification among those stored in transmitter's ID table 12, the set or selected identification is attached to the E-mail and sent out. The transmitter's identification is detailed later.

The E-mail information thus produced in sending mail creating region 16 is sent to the recipient together with the transmitter's identification as an E-mail via LAN or over the Internet according to a protocol such as SMTP. The recipient is thus able to see the transmitter's identification on the E-mail without opening an attached file including the image data.

On the other hand, when the image data input by scanner 10 is sent through a fax machine, the image data is supplied to fax sending section 5, and then the image data is sent to a recipient's fax machine via PSTN 19. The transmitter's identification has been stored in fax sending section 5, and is overwritten on the message or printed on the upper end of the message sheet before the message is sent out.

In the above description, scanner 10 reads the message to produce image data; however, the image data can be created on a PC screen and directly converted into binary data by coding section 7.

The case when communications device 2 receives the image data is now described. When device 2 receives the image data in E-mail format via LAN line 1, the recipient is able to see the image data together with the transmitter's identification on an E-mail screen. The received image data is stored in sending mail creating region 16, and can be printed on paper as a piece of fax information as well as seen on an E-mail screen. The received image data is converted into binary data, which is a fax format, in creating region 16, and then decoded into visible data, i.e., the printable data, by coding section 7. Then the data is printed by recording section 6. The image data thus received is visible on paper. When the image data is received via PSTN 19 by a regular fax machine, the image data is printed by recording section 6 via fax sending section 5 in a usual manner.

A method of creating a transmitter's identification is now described. FIG. 2A shows a default identification of a fax machine, and FIG. 2B shows a transmitter's identification (ID) table. As shown in FIG. 2A, the default stores a machine's name and address in pairs. A machine's name is usually shown by using this default and an error mail is returned to the machine's address also by using this default.

As previously described, communications device 2 is generally used by a plurality of users. When each user establishes his/her own transmitter's identification, those identifications must be registered and displayed. FIG. 2B shows an exemplary table where a plurality of users are registered. The table entries include respective users' names and mail addresses. A method of registration is described later.

When the users do not specify their own identifications, the default shown in FIG. 2A, i.e., the machine's name and mail address assigned to communications device 2, is automatically attached to a message to be sent. If a transmitter wants to attach an identification other than that assigned to device 2, e.g., his/her own name and mail address, the machine's identification assigned to device 2 must be changed. In this case, it can be changed directly by input through panel section 4, or by using the transmitter's ID table. The change operation is described with reference to the flowchart in FIG. 3.

In Step 1 (Step is called hereinafter "S"), input a recipient's address through panel section 4. Then, in S2, input whether a transmitter's identification should be changed. If the change is needed, select what is to be changed, i.e., only a name, or a name and address, in S3 through panel section 4. When only a name is changed, select which method is taken, i.e., input a new name of the transmitter directly through panel 4, or change the name in the transmitter's ID table (refer to FIG. 2B) in S4. When the name is input through panel 4, go to S5 and input the transmitter's name directly. Then, go to S7, where scanner 10 reads a message, and set the name as a transmitter's identification in S8. Finally, in S9, send it according to the E-mail transfer protocol.

In S4, when selecting the transmitter's ID table for changing the name of the transmitter, select his/her own name referring to the table in S6. A method of selecting his/her own name is described later with reference to FIG. 7. Then, follow the same procedure as discussed above, namely; go to S7 where scanner 10 reads the message, and set the name as a transmitter's identification in S8. Finally, send it out in S9.

On the other hand, when selecting not to change the transmitter's ID in S2, use the default (refer to FIG. 2A) as the transmitter's identification in S10, then go to S7 and follow the same procedure as discussed above.

In the cases discussed above, the default is still used as the E-mail address of the transmitter so that an error mail or a reply returns to or reaches communications device 2.

Figure 3:
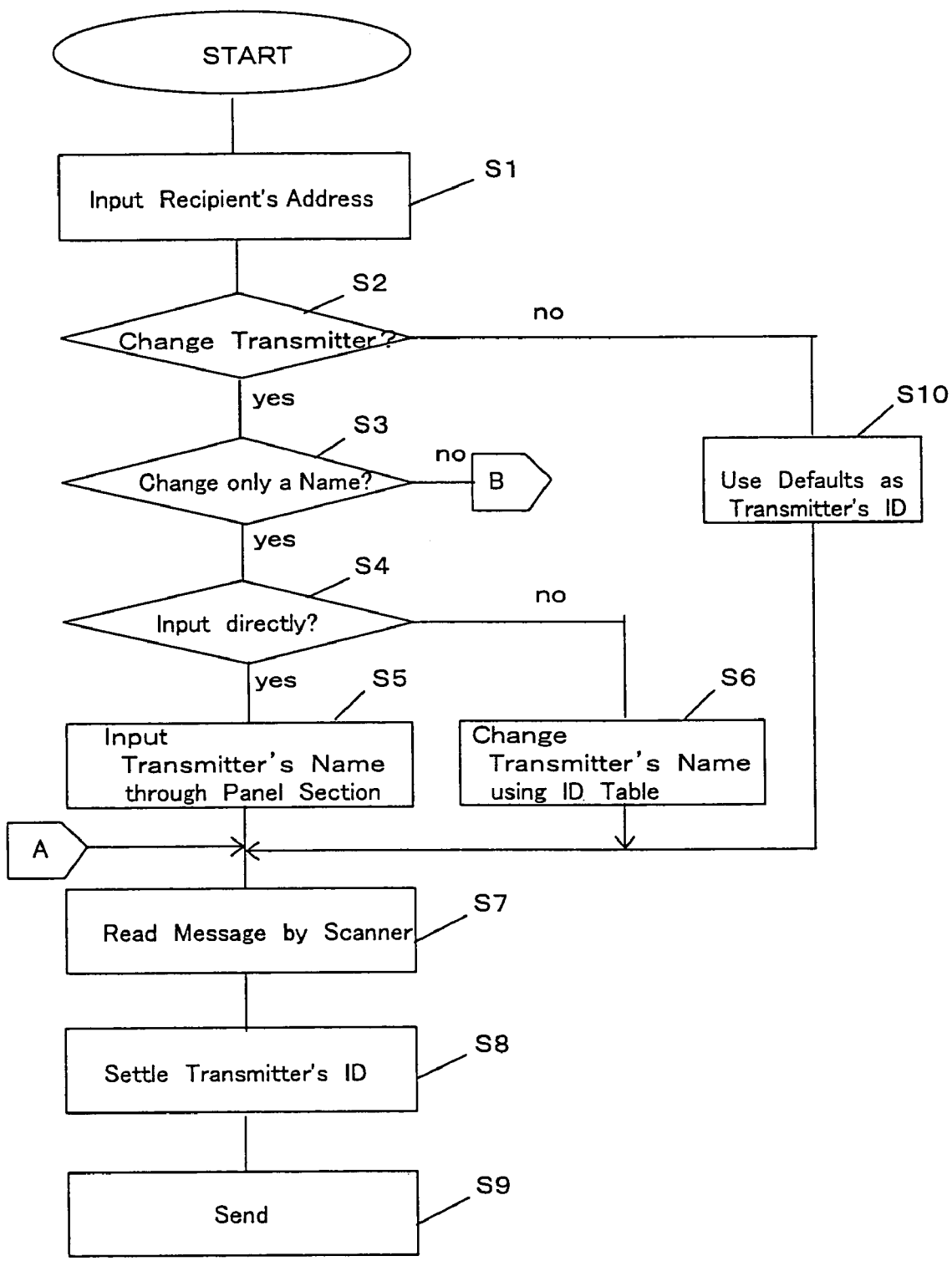
FIG. 3 is a flowchart depicting an operation for changing transmitter's name.
Figure 4:
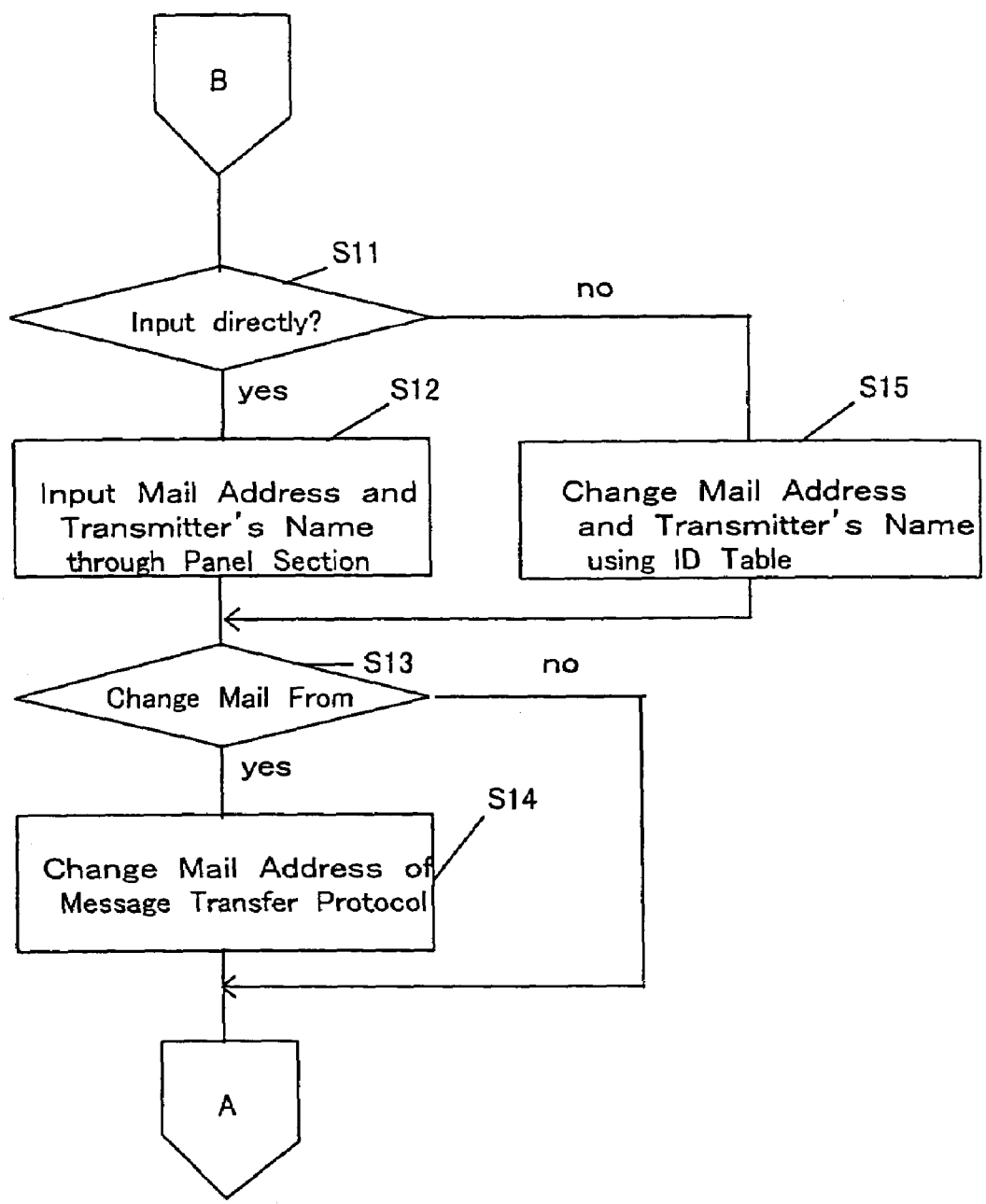
FIG. 4 is a flowchart depicting an operation for changing a name and a mail address of a transmitter.

In S3 of the flowchart shown in FIG. 3, when changing both the name and mail address is selected, the procedure shown in FIG. 4 executes.

FIG. 4 is a flowchart depicting an operation of changing both the name and mail address. In S11, select the desired method, i.e., input these two factors directly through panel 4, or change these factors in the ID table. When inputting them directly through panel 4, input the name and mail address directly through panel 4 in S12. Then, in S13 select whether the E-mail address designated by the mail From command is changed. The mail From command is issued between servers, more specifically, this command is available in the information flow (refer to FIG. 11, line 4) between servers, and is usually utilized in returning an error mail.

In FIG. 11, messages between a mail server R (receiving server) and a mail server S (sending server) are shown. "R:" indicates that a message is from mail server R and "S:" indicates that a message is from mail server S. The first line indicates that the mail server R is "BBN-UNIX.ARPA," and that the mail transfer service is ready. The second line indicates that mail server S is "USC-ISIF.ARPA." Lines 4 and 5 show the messages relating to the mail sender. Lines 6–11 show the messages relating to the mail receiver. Lines 12–17 show the messages relating to the mail data. Lines 18 and 19 show the messages relating to terminating the mail.

In a case of changing the mail From command, change the E-mail address of the command in the message transfer protocol in S14. Then, go to S7 and follows the steps shown in FIG. 3. If the mail From command is not changed in S13, go to S7 and follow the steps shown in FIG. 3.

On the other hand, when the name and mail address of the transmitter are changed by using the ID table, change these two factors in the table in S15, and then go to S13 and follow the steps onward. A method of selecting the transmitter's identification is detailed later with reference to FIG. 7.

FIG. 5A through FIG. 5F show a mail format in accordance with the SMTP standard. FIG. 5A shows a basic E-mail format. FIG. 5B shows a format where a transmitter's name is changed, and FIG. 5C shows a format where a name and an E-mail address of the transmitter are changed. FIG. 5D through FIG. 5F show formats where the transmitter's name, E-mail address, and the mail From command are changed.

The E-mail format, as shown in FIG. 5A, has the mail From command and a mail message. The command indicates the E-mail address of the transmitter, and a reply to an error mail reaches this mail address. The E-mail message includes a version number of the MIME, which is one of the E-mail standard functions, mail software (X-Mailer:), transmitter's name (comment) and E-mail address (Mail address), which make up the transmitter's identification. The E-mail message also includes a "Subject:", as well as a destination, i.e., "To:".

FIG. 5B–FIG. 5F show examples of mail formats that have been changed according to the transmitter's ID table shown in FIG. 2B. FIG. 5B shows an example where only a transmitter's name of a mail message has been changed to "suzuki". In this case, the mail From command and the E-mail address of the mail message remain the default, an error mail is returned to "fax@aaa.bbb.jp", i.e., "Internet FAX" as the machine's name of communications device 2.

FIG. 5C shows an example where the transmitter's name and mail address are changed to "suzuki". In this case, an error message is also returned to "Internet FAX", i.e., machine's name of communications device 2.

FIG. 5D shows an example where the transmitter's name, E-mail address and the mail From command are all changed to "suzuki". In this case, an error mail is returned to the E-mail address of "suzuki", the transmitter, i.e., "usr1@abc.defg.jp".

FIG. 5E shows an example where the transmitter's name, E-mail-address, and the mail From command are all changed to "MGCS". As shown in FIG. 2B, the transmitter's name "MGCS" does not have a mail address, therefore, a default mail-address, i.e., "fax@aaa.bbb.jp", is used as a mail address. In this case, an error mail is returned to the machine's name "Internet FAX" of communications device 2.

FIG. 5F shows an example where the transmitter's name, E-mail address, and mail From command are all changed to "usr4@abc.defg.jp". As shown in FIG. 2B, the E-mail address "usr4@abc.defg.jp" does not have a transmitter, thus "comment" of the transmitter is omitted. In this case, an error mail is returned to the E-mail address "usr4@abc.defg.jp".

When sending, the transmitter's identification is shown in the text of the E-mail message and in the data of the E-mail message transfer protocol. For instance, when the transmitter's identification is the E-mail address, it is shown as a mail address of the transmitter of the E-mail message transfer protocol and a mail address of a "From:" line in a message text. The E-mail address cannot be shown to the E-mail transfer message protocol, but it can be shown in the E-mail address of the "From:" line in the E-mail message because the E-mail address is the mail address of the transmission machine itself.

When a transmitter's identification is his/her mail address and his/her name, the identification is notified as a mail address and as a comment in the "From:" line of the E-mail message. When the transmitter's identification is his/her name, the identification can be notified as a comment in the "From:" line in the E-mail message.

Figure 6:
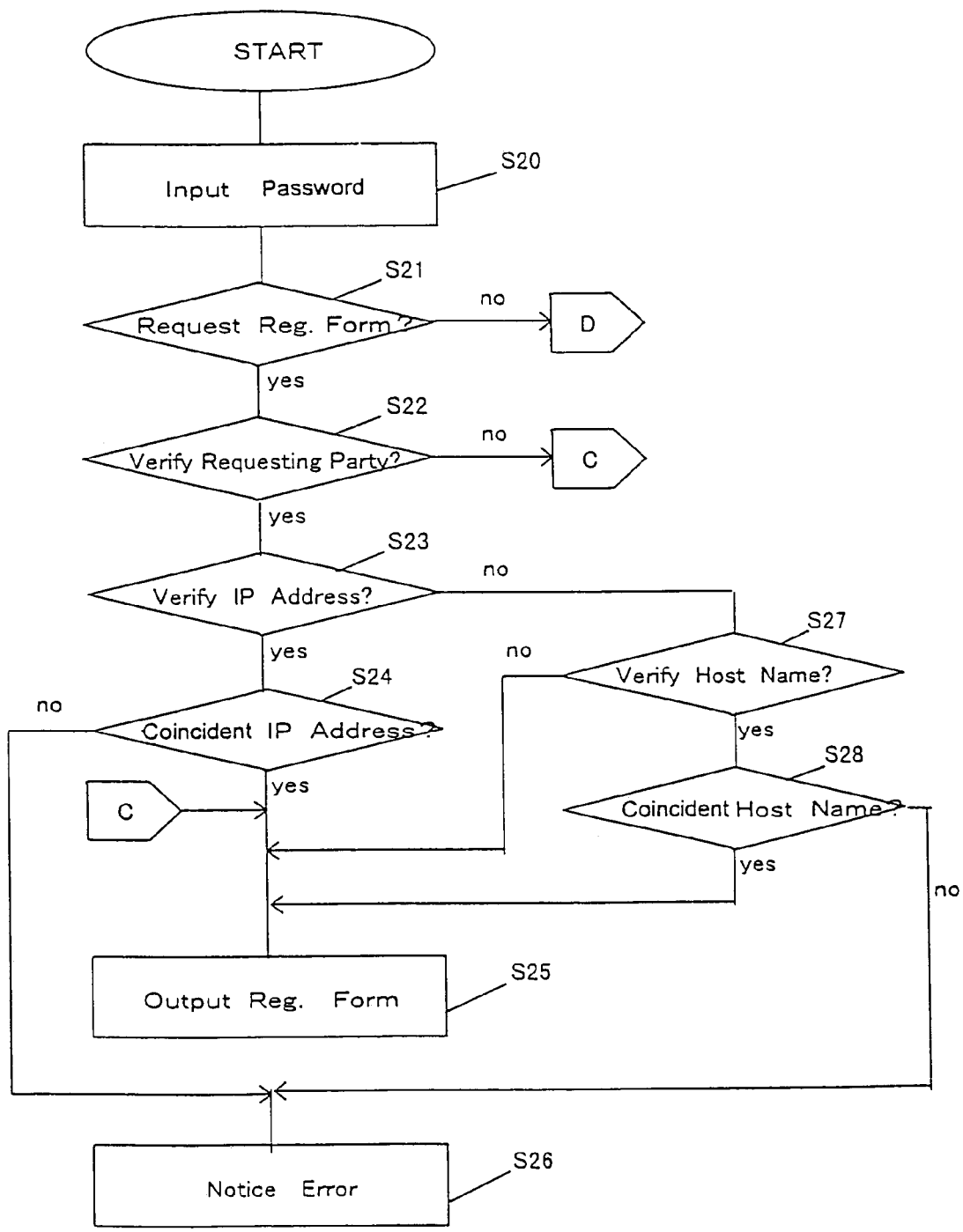
FIG. 6 is a flowchart depicting an operation in accordance with the exemplary embodiment of the present invention for displaying an input screen used for registering the transmitter's identification in a transmitter's ID table.
Figure 7:
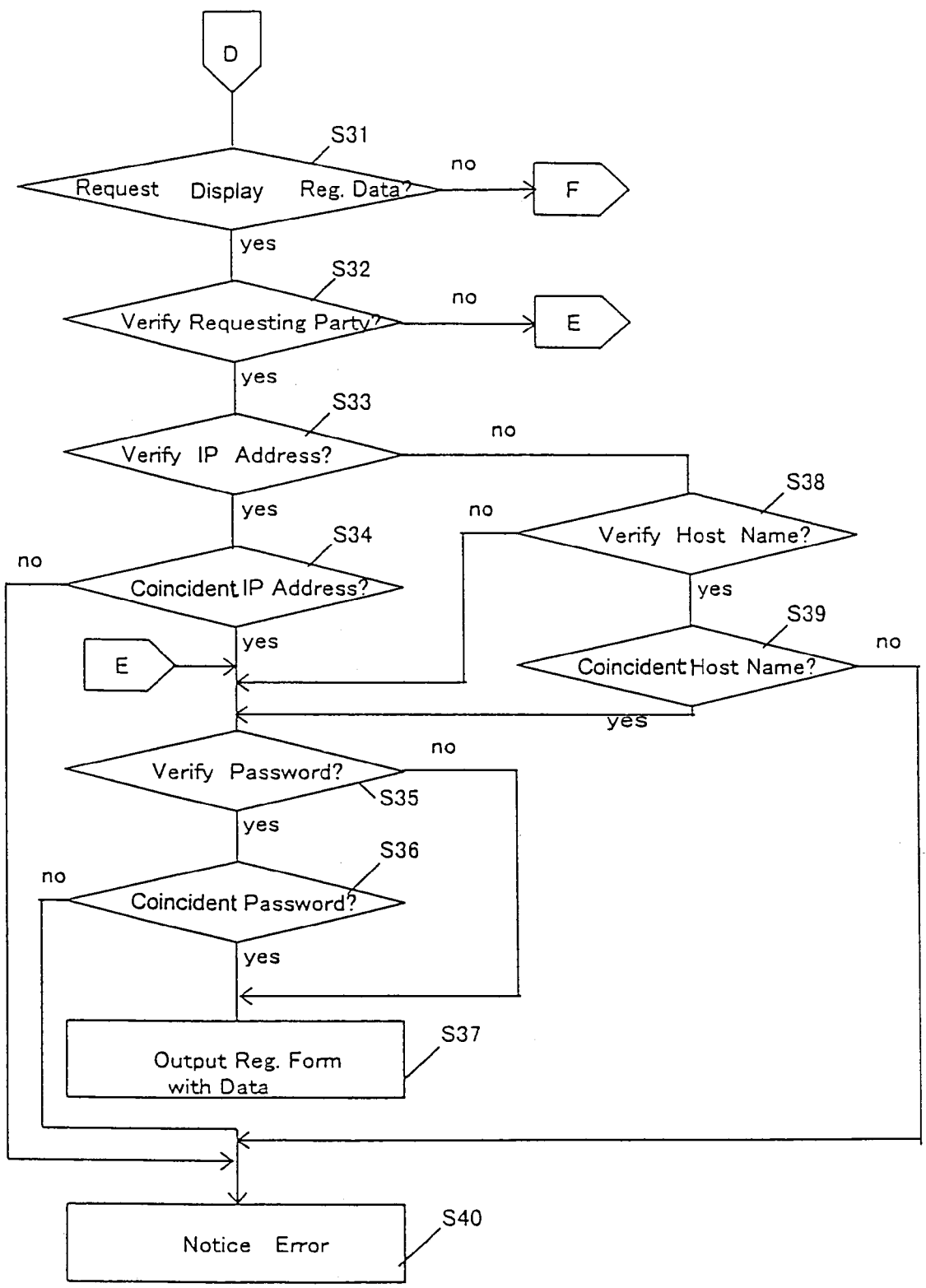
FIG. 7 is a flowchart depicting an operation in accordance with the exemplary embodiment of the present invention for displaying the transmitter's identification from the transmitter's ID table.
Figure 8:
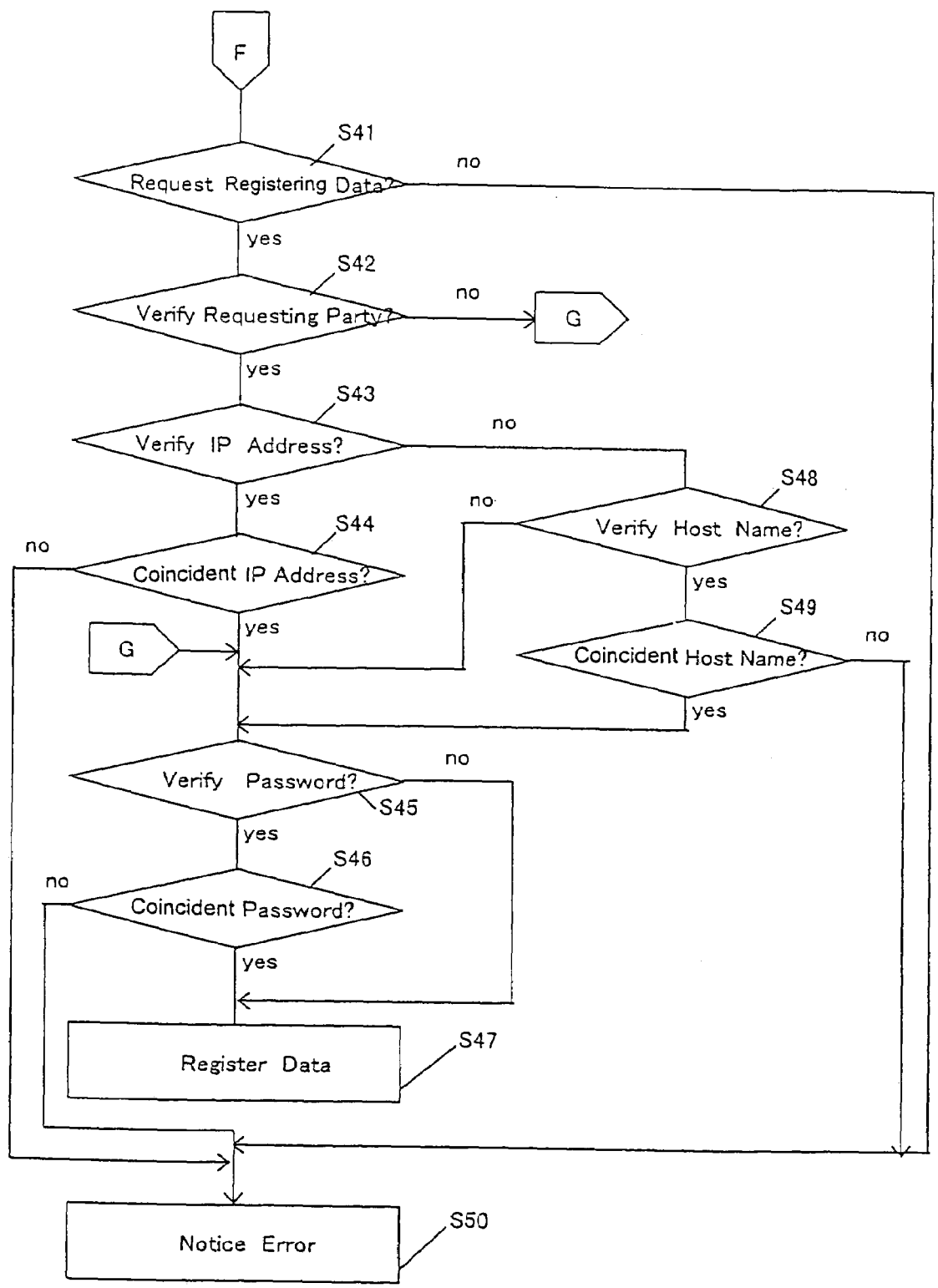
FIG. 8 is a flowchart depicting an operation in accordance with the exemplary embodiment of the present invention for registering the transmitter's identification in the transmitter's ID table.

Next, a method of registering and displaying a transmitter's identification is described. FIGS. 6–8 are flowcharts depicting the operation of registering and displaying the transmitter's identification. FIG. 6 is a flowchart depicting an operation of displaying an input screen. FIG. 7 is a flowchart depicting an operation of displaying registered data. FIG. 8 is a flowchart depicting an operation of registering the transmitter's identification.

The operation of displaying the input screen for registering the transmitter's identification is now described. Communications device 2 is furnished with an indication (YES/NO) of whether it is necessary to verify a requesting party before outputting a registration form. If YES has been registered at device 2, the device must be informed of whether verification by an IP address or by a host name is necessary. When verification by IP address is practiced, the IP address must be registered in advance at the transmitter's ID table, shown in FIG. 9A; when verification by host name is practiced, the host name must be registered in advance at the host name table, shown in FIG. 9B.

In FIG. 6, first input a password in S20 (Step 20), then determine, when HTTP protocol makes a request, whether a registration form has been requested to be displayed in S21. If the protocol requests the registration form to be displayed, it is determined in S22, when verification is necessary, whether a requesting party is already registered. This verification in S22 allows only a given host already registered to verify registered information or to register information, and prevents the information from being accessed by other hosts. The information security is thus maintained. When the information is protected by a firewall and is adequately protected from access by outsiders, "NO verification" is set in S22.

When "YES verification" is set in S22, determine in S23 whether IP address verification is required. If IP address verification is required, then determine whether an IP address of the station requesting the registration form by HTTP protocol agrees with the IP address already registered in S24. When the IP addresses agree, output the registration form in S25. When the IP addresses do not agree, it is determined that an outsider is attempting access, and then, issue an error notice or reject the request and do not output the registration form in S26. The registering operation thus does not occur.

Because the IP address is attached to the PC terminal or the server that requests the registration form, it must be determined whether this IP address agrees with the IP addresses already registered at the transmitter's ID table. This IP address agreement is determined as follows.

Assume that the IP address and IP mask already registered are the content of FIG. 9A. If a PC having IP address "001.001.002.123" requests output of the registration form when the IP mask is not set, this request is accepted because this IP address agrees with that registered at the transmitter's ID table. On the other hand, if a PC having IP address "001.001.002.124" requests the output of the registration form, this request is refused because this IP address does not agree with that registered at the transmitter's IDs table. FIG. 12A depicts this procedure.

When the IP mask is set as shown in FIG. 9A, the following process is practiced. If the PC having an IP address of "001.001.001.103" requests output of the registration form, this request is accepted because the IP address with the mask agrees with the "001.001.001" portion since the IP mask is "255.255.255.128". On the other hand, if the PC having an IP address of "001.001.001.201" requests the output of the registration form, this request is refused because the IP address with the mask does not agree with the registered IP address. FIG. 12B depicts this procedure.

In FIG. 6, when the verification by IP address is not set in S23, determine in S27 whether a host name verification is set. If the verification has been set, determine whether the host name of the station requesting the output of the registration form by HTTP protocol agrees with the host name already registered at the host name table, shown in FIG. 9B, in S28.

Assume that the host name has been registered as FIG. 9B shows. When the PC having the host name of "pc1.abc.defg.jp" requests the output of the registration form, as shown in FIG. 12C, this request is accepted because the host name agrees with that registered at the host name table shown in FIG. 9B. On the other hand, when the PC having the host name of "pc3.abc.defg.jp" requests the output of the registration form, this request is refused because the host name does not agree with that registered in the table.

When the workstation having the host name of "ws1.aaa.bbb.jp" requests the output of registration form as shown in FIG. 12D, this request is accepted because the domain of this host name agrees with that of the host name registered in the host name table. On the other hand, when the workstation having the host name of "ws2.aab.bbb.jp" requests the output of the registration form, this request is refused because the domain of this host name is not registered in the table and the host name does not agree with the domain of the host name in the host name table.

When the host names agree in S28, output the registration form in S25. When the host names do not agree, issue an error notice, or reject the request and do not output the registration form in S26. The registering operation thus does not occur. If the verification of the requesting party is not needed in S22, or no verification of the host name has been set in S27, then output the registration form in S25.

FIG. 10 depicts an embodiment of registering and verifying the form by an HTML document. In FIG. 10, "f1" indicates an input area for a password for registering and displaying, and "f2" as well as "f3" indicate an input area for selecting either registration or display. A click selects either one. Clicking "f2" selects a new registration, and clicking "f3" selects display of registered data. Indicated by "f4" is an area for registering/displaying a transmitter's name, and "f5" indicates an area for registering/displaying a mail address. Indicated by "f6" is an ON/OFF switch, which sets the necessity of changing a transmitter's mail address of E-mail message transfer protocol to YES/NO. Indicated by "f7" is a send switch for sending input data, and "f8" is a canceling switch for erasing the input data.

When displaying registered data, set a password in the password input area indicated by "f1". Next, click the display area indicated by "f3", and click the send switch indicated by "f7". Then, registered content is read out and displayed in the registering/displaying area indicated by "f4" and mail address registering/displaying area indicated by "f5".

When a new registration is required, set a password in the password input area indicated by "f1", and click the registering/inputting area indicated by "f2" to select "registration". Next, input a transmitter's name in the transmitter's name registering/displaying area indicated by "f4", and also input a mail address in the E-mail address registering/displaying area indicated by "f5". When changing the E-mail address of transmitter of E-mail message transfer protocol, click the ON/OFF switch indicated by "f6" to turn ON. Finally, click the send switch indicated by "f7" to complete the registration.

Next, the process of displaying the registered data is described. When the step S21 shown in FIG. 6 is not a request for the registration form, move to the flowchart shown in FIG. 7 for displaying registered data. First, determine whether S31 has a request through HTTP protocol for displaying registered data by the input signal. If S31 has the request for displaying the registered data, determine in S32 whether verification of a requesting party is needed, i.e., whether the requesting party is identified as already registered. If the verification is needed, determine in S33 whether verification is practiced with an IP address. When the verification with an IP address has been set, determine in S34 whether the IP address of the station requesting the registered data with HTTP protocol agrees with one of the IP addresses already registered. If the IP addresses agree, determine in S35 whether password verification is needed. If password verification is needed, determine in S36 whether the password input together with the request for registered data by HTTP protocol agrees with the password already registered. When the passwords agree, output the registration form where the transmitter's name of "f4" and mail address of "f5" pair with registered data in S37.

When the IP address verification is not needed in S33, determine whether a host name must be verified in S38. If the verification is needed, determine whether the host names agree in S39. If the host names agree, go to S35 where the necessity of password verification is determined. If the host name verification is not needed in S38, or the verification of the requesting party is not needed in S32, go to S35 where the password is verified.

If the IP addresses do not agree in S34, the passwords do not agree in S36, or the host names do not agree in S39, go to S40. Then, issue an error message or reject the request, and do not output the registration form.

Next, a process of registering data is described. In S31 of FIG. 7, if there is no request to display the registered data, go to the flowchart for registering data, shown in FIG. 8. First, in S41, determine whether registering data is requested. If registering data is requested, then confirm whether a verification is needed, i.e., if the requesting party has been registered.

Respective steps from S42 to S46 are identical to S32–S36 shown in FIG. 7, and S48 and S49 are also identical to S38 and S39 shown in FIG. 7. Their description is thus omitted here.

When the passwords agree in S46, or the password verification is not needed in S45, register the data in S47. On the other hand, when there is no request for registering data in S41, go to S50, then, issue an error notice and do not register data. Also, when the IP address in S44, the password in S46, and the host name in S49 do not agree with respective counterparts, go to S50.

The communications device of the present invention as discussed above comprises the following elements: an image data creating section; an image data sending section for sending an image data according to an E-mail message transfer protocol; a register for registering multiple transmitters' identifications; and an identification sending section for selecting one of the identifications and sending it through E-mail.

Using the communications device having the elements discussed above, when a transmitter sends image data by E-mail over the Internet, the transmitter puts his/her identification in a "From:" line for each mail based on an operator's intention. A recipient then can identify the transmitter before opening a file attached to the image data. When the recipient answers the E-mail using a reply function of the E-mail browsing software, this communications device allows the answer data to reach an intended person.

According to an aspect of the present invention this communications device does not output the registered data or HTML document for data input when a host other than one registered or an address other than a registered IP addresses requests, according to the HTTP protocol, to read the registered image or data. Therefore, the communications device of the present invention allows a transmitter's identification to be registered or displayed only when a registered host or a registered IP address holder makes a request. The identifications are thus kept secret from non-registered hosts and IP addresses.

While the invention has been described with reference to exemplary embodiments, it is understood that the words that have been used are words of description and illustration, rather than words of limitation. Changes may be made within the purview of the disclosure as presently stated and as amended, without departing from the scope and spirit of the invention in its aspects. Further, although the invention has been described with reference to particular means, materials, and embodiments, the invention is not intended to be limited to the particulars disclosed herein. For example, requests through protocols other than HTTP are possible, as are document formats other than HTML. Rather, the invention extends to all functionally equivalent structures, methods and uses. Although the present invention has been described in considerable detail with reference to certain preferred embodiments, other embodiments are possible. Therefore, the scope and spirit of the appended claims should not be limited to the description of the preferred embodiments contained herein.

What is claimed is:

1. An image data communication apparatus connected to an image data source and to a network, and transmitting image data attached to an e-mail to a receiving apparatus through a server via the network, the e-mail including a mail from command and a mail message, the image data communication apparatus comprising:

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel;

the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, the e-mail address set into the mail from command of the e-mail is utilized as a destination of a mail error message, the mail error message being returned from the server to the e-mail address set into the mail from command.

2. The image data communication apparatus according to claim 1, wherein the image data source comprises a scanner connected to the image communication data apparatus.

3. The image data communication apparatus according to claim 1, wherein the panel comprises a personal computer connected to the image data communication apparatus.

4. The image data communication apparatus according to claim 3, wherein the personal computer displays an HTML document for inputting the e-mail address of the user to the image data communication apparatus.

5. The image data communication apparatus according to claim 1, wherein the image data attached to the e-mail is converted into a format for e-mail transmission.

6. An image data communication apparatus connected to an image data source and to a network, and transmitting image data attached to an e-mail to a receiving apparatus through a server via the network, the e-mail including a mail from command and a mail message, the image data communication apparatus comprising:

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel;

the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, a mail error message is returned from the server to the e-mail address set into the mail from command.

7. The image data communication apparatus according to claim 6, wherein the image data source comprises a scanner connected to the image communication data apparatus.

8. The image data communication apparatus according to claim 6, wherein the panel comprises a personal computer connected to the image data communication apparatus.

9. The image data communication apparatus according to claim 8, wherein the personal computer displays an HTML document for inputting the e-mail address of the user to the image data communication apparatus.

10. The image data communication apparatus according to claim 6, wherein the image data attached to the e-mail is converted into a format for e-mail transmission.

11. An image data communication apparatus connected to an image data source and to a network, and transmitting image data attached to an e-mail to a receiving apparatus through a server via the network, the e-mail including a mail from command and a mail message, the image data communication apparatus comprising:

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel, the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, a mail error message is returned from the server to the e-mail address set into the mail from command, the mail error message indicating an error in one of transmission of the e-mail by the image data communication apparatus and reception of the e-mail by the receiving apparatus.

12. The image data communication apparatus according to claim 11, wherein the image data source comprises a scanner connected to the image communication data apparatus.

13. The image data communication apparatus according to claim 11, wherein the panel comprises a personal computer connected to the image data communication apparatus.

14. The image data communication apparatus according to claim 13, wherein the personal computer displays an HTML document for inputting the e-mail address of the user to the image data communication apparatus.

15. The image data communication apparatus according to claim 11, wherein the image data attached to the e-mail is converted into a format for e-mail transmission.

16. An image data communication apparatus connected to a network, the image data communication apparatus comprising:

a transmitter configured to transmit image data attached to an e-mail to a receiving apparatus through a server via the network, the e-mail including a mail from command and a mail message;

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel;

the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, the e-mail address set into the mail from command of the e-mail is utilized as a destination of a mail error message, the mail error message being returned from the server to the e-mail address set into the mail from command.

17. The image data communication apparatus according to claim 16, wherein the image data attached to the e-mail is converted into a format for e-mail transmission.

18. An image data communication apparatus connected to a network, the image data communication apparatus comprising:

a transmitter configured to transmit image data attached to an e-mail to a receiving apparatus through a server via the network, the e-mail including a mail from command and a mail message;

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel;

the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, a mail error message is returned from the server to the mail address set into the mail from command.

19. The image data communication apparatus according to claim 18, wherein the image data attached to the e-mail is converted into a format for e-mail transmission.

20. An image data communication apparatus connected to a network, the image data communication apparatus comprising:

a transmitter configured to transmit image data attached to an e-mail to a receiving apparatus through a server via the network, the e-mail including a mail from command and a mail message;

a memory configured to store a default e-mail address;

a panel configured to input an e-mail address of a user to the image data communication apparatus; and a controller configured to set the default e-mail address into the mail from command of the e-mail to which the image data is attached when the e-mail address of the user is not input by the panel;

the controller being configured to set the e-mail address of the user, input by the panel, into the mail from command of the e-mail to which the image data is attached when the e-mail address of the user is input by the panel, the mail from command being utilized for a communication between the image data communication apparatus and the server, whereby, when an error occurs, a mail error message is returned from the server to the e-mail address set into the mail from command, the mail error message indicating an error in one of transmission of the e-mail by the image data communication apparatus and reception of the e-mail by the receiving apparatus.

21. The image data communication apparatus according to claim 20, wherein the image data attached to the e-mail is converted into a format for e-mail transmission.

22. A method for controlling an image data communication apparatus connected to an image data source and to a network, and transmitting image data attached to an e-mail to a receiving apparatus through a server via the network, the e-mail including a mail from command and a mail message, a memory storing a default e-mail address, an e-mail address of a user being an address other than the default e-mail address, the method comprising:

setting the default e-mail address into the mail from command of the e-mail to which the image data is attached when the e-mail address of the user is not input; and setting the e-mail address of the user into the mail from command of the e-mail to which the image data is attached when the e-mail address of the user is input, the mail from command being utilized for a communication between the image data communication apparatus and the server, whereby, when an error occurs, the e-mail address set into the mail from command of the e-mail is utilized as a destination of a mail error message, the mail error message being returned from the server to the e-mail address set into the mail from command.

23. The method according to claim 22, wherein the image data attached to the e-mail is converted into a format for e-mail transmission.

24. A method for controlling an image data communication apparatus connected to an image data source and to a network, and transmitting image data attached to an e-mail to a receiving apparatus through a server via the network, the e-mail including a mail from command and a mail message, a memory storing a default e-mail address, an e-mail address of a user being an address other than the default e-mail address, the method comprising:

setting the default e-mail address into the mail from command of the e-mail to which the image data is attached when the e-mail address of the user is not input; and setting the e-mail address of the user into the mail from command of the e-mail to which the image data is attached when the e-mail address of the user is input, the mail from command being utilized for a communication between the image data communication apparatus and the server, whereby, when an error occurs, a mail error message is returned from the server to the e-mail address set into the mail from command.

25. The method according to claim 24, wherein the image data attached to the e-mail is converted into a format for e-mail transmission.

26. A method for controlling an image data communication apparatus connected to an image data source and to a network, and transmitting image data attached to an e-mail to a receiving apparatus through a server via the network, the e-mail including a mail from command and a mail message, a memory storing a default e-mail address, an e-mail address of a user being an address other than the default e-mail address, the method comprising:

setting the default e-mail address into the mail from command of the e-mail to which the image data is attached when the e-mail address of the user is not input; and setting the e-mail address of the user into the mail from command of the e-mail to which the image data is attached when the e-mail address of the user is input, the mail from command being utilized for a communication between the image data communication apparatus and the server, whereby, when an error occurs, a mail error message is returned from the server to the e-mail address set into the mail from command, the mail error message indicating an error in one of transmission of the e-mail by the image data communication apparatus and reception of the e-mail by the receiving apparatus.

27. The method according to claim 26, wherein the image data attached to the e-mail is converted into a format for e-mail transmission.

28. A method for controlling an image data communication apparatus connected to a network, and transmitting image data attached to an e-mail to a receiving apparatus through a server via the network, the e-mail including a mail from command and a mail message, a memory storing a default e-mail address an e-mail address of a user being an address other than the default e-mail address, the method comprising:

setting the default e-mail address into the mail from command of the e-mail to which the image data is attached when the e-mail address of the user is not input;

setting the e-mail address of the user into the mail from command of the e-mail to which the image data is attached when the e-mail address of the user is input, the mail from command being utilized for a communication between the image data communication apparatus and the server, whereby, when an error occurs, the e-mail address set into the mail from command of the e-mail is utilized as a destination of a mail error message, the mail error message being returned from the server to the e-mail address set into the mail from command; and transmitting the image data attached to the e-mail to the receiving apparatus via the network.

29. The method according to claim 28, wherein the image data attached to the e-mail is converted into a format for e-mail transmission.

30. A method for controlling an image data communication apparatus connected to a network, and transmitting image data attached to an e-mail to a receiving apparatus through a server via the network, the e-mail including a mail from command and a mail message, a memory storing a default e-mail address, an e-mail address of a user being an address other than the default e-mail address, the method comprising:

setting the default e-mail address into the mail from command of the e-mail to which the image data is attached when the e-mail address of the user is not input;

setting the e-mail address of the user into the mail from command of the e-mail to which the image data is attached when the e-mail address of the user is in put, the mail from command being utilized for a communication between the image data communication apparatus and the server, whereby, when an error occurs, a mail error message is returned from the server to the e-mail address set into the mail from command; and transmitting the image data attached to the e-mail to the receiving apparatus via the network.

31. The method according to claim 30, wherein the image data attached to the e-mail is converted into a format for e-mail transmission.

32. A method for controlling an image data communication apparatus connected to a network, and transmitting image data attached to an e-mail to a receiving apparatus through a server via the network, the e-mail including a mail from command and a mail message, a memory storing a default e-mail address, an e-mail address of a user being an address other than the default e-mail address, the method comprising:

setting the default e-mail address into the mail from command of the e-mail to which the image data is attached when the e-mail address of the user is not input;

setting the e-mail address of the user into the mail from command of the e-mail to which the image data is attached when the e-mail address of the user is input, the mail from command being utilized for a communication between the image data communication apparatus and the server, whereby, when an error occurs, a mail error message is returned from the server to the e-mail address set into the mail from command, the mail error message indicating an error in one of transmission of the e-mail by the image data communication apparatus and reception of the e-mail by the receiving apparatus; and transmitting the image data attached to the e-mail to the receiving apparatus via the network.

33. The method according to claim 32, wherein the image data attached to the e-mail is converted into a format for e-mail transmission.

* * * * *